United States Patent
Asadi et al.

(10) Patent No.: US 12,214,337 B2
(45) Date of Patent: Feb. 4, 2025

(54) TRANSITION METAL MXENE CATALYSTS FOR CONVERSION OF CARBON DIOXIDE TO HYDROCARBONS

(71) Applicants: Mohammad Asadi, Chicago, IL (US); Alireza Kondori, Chicago, IL (US); Mohammadreza Esmaeilirad, Chicago, IL (US); Andres Ruiz Belmonte, Cantabria (ES)

(72) Inventors: Mohammad Asadi, Chicago, IL (US); Alireza Kondori, Chicago, IL (US); Mohammadreza Esmaeilirad, Chicago, IL (US); Andres Ruiz Belmonte, Cantabria (ES)

(73) Assignee: ILLINOIS INSTITUTE OF TECHNOLOGY, Chicago, IL (US)

( * ) Notice: Subject to any disclaimer, the term of this patent is extended or adjusted under 35 U.S.C. 154(b) by 0 days.

(21) Appl. No.: 18/225,765

(22) Filed: Jul. 25, 2023

(65) Prior Publication Data
US 2023/0364590 A1 Nov. 16, 2023

Related U.S. Application Data

(63) Continuation-in-part of application No. 17/134,707, filed on Dec. 28, 2020, now abandoned, which is a
(Continued)

(51) Int. Cl.
*C25B 3/26* (2021.01)
*B01J 27/22* (2006.01)
(Continued)

(52) U.S. Cl.
CPC ............. *B01J 27/22* (2013.01); *B01J 27/24* (2013.01); *B01J 35/40* (2024.01); *C25B 3/26* (2021.01)

(58) Field of Classification Search
None
See application file for complete search history.

(56) References Cited

U.S. PATENT DOCUMENTS

| | | |
|---|---|---|
| 4,523,981 A | 6/1985 | Ang et al. |
| 9,528,192 B1 | 12/2016 | Chen |

(Continued)

FOREIGN PATENT DOCUMENTS

| | | |
|---|---|---|
| IN | 2017/31029391 A | 9/2017 |
| WO | WO 2017/112557 A1 | 6/2017 |

OTHER PUBLICATIONS

Zhong et al. (Chem. Commun., 2018, 54, 11324) (Year: 2018).*

(Continued)

*Primary Examiner* — Wojciech Haske
(74) *Attorney, Agent, or Firm* — Pauley Erickson & Swanson

(57) ABSTRACT

Transition metal MXene catalysts and methods for using with electrochemical cells for reduction of carbon dioxide and production of hydrocarbons. The transition metal catalysts include nanostructured transition metal carbides, nitrides, or carbonitrides. The method includes electrochemically reducing carbon dioxide in an electrochemical cell, by contacting the carbon dioxide with at least one transition metal carbide, nitride, or carbonitride catalyst in the electrochemical cell and applying a potential to the electrochemical cell. Also an apparatus and method for energy production and carbon sequestration. A photovoltaic cell is paired with an electrochemical cell, wherein a cathode side of the electrochemical cell reduces carbon dioxide to hydrocarbon, and an anode side of the electrochemical cell oxidizes water to oxygen. The hydrocarbon outlet can be connected to a heating element of an air handling unit, and the oxygen can likewise be introduced to the unit for air (Continued)

improvement. The cathode includes transition metal catalysts for reducing the carbon dioxide.

16 Claims, 2 Drawing Sheets

Related U.S. Application Data continuation of application No. PCT/US2019/035577, filed on Jun. 5, 2019, and a continuation of application No. PCT/US2019/035580, filed on Jun. 5, 2019.

(60) Provisional application No. 62/691,726, filed on Jun. 29, 2018, provisional application No. 62/691,731, filed on Jun. 29, 2018.

(51) Int. Cl.
*B01J 27/24* (2006.01)
*B01J 35/40* (2024.01)

(56) References Cited

U.S. PATENT DOCUMENTS

| | | |
|---|---|---|
| 2012/0018311 A1 | 1/2012 | Yotsuhashi et al. |
| 2012/0234691 A1 | 9/2012 | Deguchi et al. |
| 2018/0023198 A1 | 1/2018 | Graetzel et al. |
| 2021/0115572 A1 | 4/2021 | Asadi et al. |

OTHER PUBLICATIONS

Zhong et al. (2017 J. Electrochem. Soc. 164 F923). (Year: 2017).*
Khadhraoui et al. (Chem. Commun., 2018,54, 11630-11633). (Year: 2018).*
Gebre (Results in Chemistry 5 '2023' 100952). (Year: 2023).*
Li, N. et al., Understanding of Electrochemical Mechanisms for $CO_2$ Capture and Conversion into Hydrocarbon Fuels in Transition-Metal Carbides (MXenes), ACS Nano, Sep. 11, 2017, 10825-10833.
ISA/US, English language verison of the International Search Report, Form PCT/ISA/210, for International Application PCT/US2019/035577, Sep. 10, 2019 (3 pages).
ISA/US, Written Opinion of the International Searching Authority, Form PCT/ISA/ for International Application PCT/US2019/035577, Sep. 10, 2019 (6 pages).
ISA/US, English language verison of the International Search Report, Form PCT/ISA/210, for International Application PCT/US2019/035580, Sep. 18, 2019 (3 pages).
SA/US, Written Opinion of the International Searching Authority, Form PCT/ISA/ for International Application PCT/US2019/035580, Sep. 18, 2019 (7 pages).

* cited by examiner

TRANSITION METAL MXENE CATALYSTS FOR CONVERSION OF CARBON DIOXIDE TO HYDROCARBONS

CROSS REFERENCE TO RELATED APPLICATIONS

This application is a continuation-in-part of U.S. application Ser. No. 17/134,707, filed on 28 Dec. 2020, which is a continuation of each of: PCT International Application No. PCT/US2019/035577, filed on 5 Jun. 2019, which claims the benefit of U.S. Application, Ser. No. 62/691,726, filed on 29 Jun. 2018; and PCT International Application No. PCT/US2019/035580, filed on 5 Jun. 2019, which claims the benefit of U.S. Application, Ser. No. 62/691,731, filed on 29 Jun. 2018. The application(s) are hereby incorporated by reference herein in its entirety and is made a part hereof, including but not limited to those portions which specifically appear hereinafter.

BACKGROUND OF THE INVENTION

Field of the Invention

The invention relates generally to photoelectrochemical cells, and more particularly, methods for using cells for reduction of carbon dioxide and/or production of hydrocarbons.

This invention also relates generally to energy generation and carbon removal and, more particularly, to a façade cladding system and method that provides an artificial photosynthesis process for energy generation and carbon removal.

Description of Related Art

Today, the rapid growth of the population is draining the finite resources of the Earth's crust, i.e., fossil fuels, coals, and minerals, to supply their energy needs. Although fossil fuels have been widely used as the energy resource, when burnt, are the primary cause of global warming due to the released $CO_2$. Therefore, developing a net zero carbon cycle, in which the released $CO_2$ can be transformed into valuable products and fuels using renewable and sustainable energy is quite desirable.

Electrocatalytic reduction of carbon dioxide to value-added chemicals using renewable energy sources is one of the promising approaches to reach to this goal. Thus far, most of the efforts have been focused to reduce $CO_2$ into CO as a final product in a electrocatalysis process. However, CO is known as an intermediate product and must be mixed with hydrogen ($H_2$) in the desired ratio to produce syngas. The produced syngas also has to feed into a less efficient thermal process (Fischer-Tropsch) to produce value-added chemicals such as methanol. Therefore, reaching to the goal of the net-zero carbon emission process by producing syngas is not economically feasible.

Among various possible products of a $CO_2$ reduction reaction, hydrocarbon fuels, such as methane ($CH_4$), ethylene ($C_2H_4$) and ethane ($C_2H_6$), that have much higher energy density compared with carbon monoxide (CO), a common gas phase product of this reaction. The energy densities of $CH_4$ (891.1 kJ $mol^{-1}$), $C_2H_4$ (1411.2 kJ $mol^{-1}$) and $C_2H_6$ (1554 kJ $mol^{-1}$) are three, five and about six times higher than CO (283.4 kJ $mol^{-1}$), respectively. Moreover, these gases can be utilized directly as fuels or fed into various petrochemical/chemical processes to produce other valuable chemicals. To date, numerous types of copper catalysts such as oxide drive copper, copper nanoparticles, and nanorods have been used to reduce $CO_2$ into hydrocarbon fuels such as $CH_4$, $C_2H_4$, and $C_2H_6$. However, despite enormous efforts, none of them are capable of efficiently producing hydrocarbon fuels directly from carbon dioxide. Therefore, developing catalysts that can directly result in hydrocarbon formation is highly desirable.

Metals such as copper, silver, nickel, etc., have also been employed in the catalytic conversion of $CO_2$ into high-value products. However, none of them show a reasonable faradaic efficiency for $CH_4$, $C_2H_4$, and $C_2H_6$ formation with respect to the applied overpotential. Therefore, an economical methane formation system cannot be obtained because of the low energy efficiency of the conventional metal catalysts.

Buildings contribute about 41% to primary energy use, 75% to electricity consumption, and 39% to $CO_2$ emissions in the US, annually. Building skins with energy generation capabilities have been developed in the past by integration of photovoltaic (PV) panels in a building façade. Building skins with carbon sequestering capabilities have been explored too (e.g., the use of bio-based materials in building). There is a need for building skins with both energy generation and carbon removal capabilities.

SUMMARY OF THE INVENTION

A general object of the invention is to provide an improved method and system for carbon dioxide reduction into valuable end products such as hydrocarbons. Embodiments of this invention incorporate a catalyst that can selectively produce, for example, $CH_4$ (natural gas) with 100-fold higher turnover frequency, 40 times higher selectivity at four times less energy compared to state of the art catalysts (e.g., copper). Other exemplary hydrocarbon fuels possible by this invention include, without limitation, ethylene ($C_2H_4$) and ethane ($C_2H_6$) with 1411.2 and 1554 kJ $mol^{-1}$ energy density, respectively. The type of hydrocarbon can depend on the stoichiometric ratio of the catalyst used.

The invention includes a catalyst composition for carbon dioxide reduction, including at least one transition metal MXene catalyst. The transition metal catalyst comprises a nanostructured MXene carbide, nitride, or carbonitride, such as $M_yX_z$, wherein M is a transition metal, X is carbon, nitrogen or carbonitride (e.g., $M_xC_yN_z$), and y and z are stoichiometric ratio integers. The invention further includes MXene catalysts of an alloy form, having two or more different types of metals bonded within the catalyst, such as $M^1xM^2yXz$ or $M^1wM^2xM^3yXz$, wherein $M^1$, $M^2$, and $M^3$ are each different metal types, desirably including one or more different types of transition metals, X is carbon, nitrogen or carbonitride, and w, x, y, and z are each stoichiometric ratio integers. The alloy catalysts of this invention are particularly suited for producing C—C bonded hydrocarbons. The transition metal can be, for example, molybdenum, tungsten, titanium, or cobalt. In embodiments of this invention, the transition metal MXene catalyst comprises a nanoparticle form, such as having an average size between about 1 nm and 400 nm. The transition metal MXene catalyst can further be a nanoflake, nanosheet, or nanoribbon form.

The invention further includes an electrochemical cell having a cathode with at least one transition metal catalyst, and in contact with an electrolyte. The electrolyte, such as a solution of 1 M $KHCO_3$, is saturated with the carbon dioxide to be treated, which can be fed into the electrolyte through any known manner.

The invention further includes a method of electrochemically reducing carbon dioxide, including: introducing the carbon dioxide to a catalyst comprising a transition metal catalyst in an electrochemical cell; applying a potential to the electrochemical cell; and converting the carbon dioxide to a hydrocarbon. Embodiments of the invention further include steps of providing the electrochemical cell including a cathode coated with the catalyst, and an electrolyte in contact with the cathode and the catalyst; providing carbon dioxide to the electrochemical cell; and applying the potential to the electrochemical cell in the presence of the carbon dioxide to reduce the carbon dioxide to the hydrocarbon.

Another general object of the invention is to provide an improved method and system for carbon dioxide reduction into valuable end products such as hydrocarbons. Embodiments of this invention incorporate a catalyst that can selectively produce hydrocarbons, such as $CH_4$ (natural gas).

Embodiments of the invention provide and/or include artificial leaf (AL) technology, which combines sunlight, carbon dioxide, and water to generate energy in an artificial photosynthesis process, providing both energy production and carbon sequestration. The invention provides an AL-based structure cladding that is capable of generating hydrocarbons such as methane as a source of energy while removing carbon dioxide from the air, through carbon-neutral chemical processes. The AL-based cladding of this invention can reduce carbon dioxide to methane with improved efficiency. The system also oxidizes water into oxygen. The produced oxygen potentially can be used by the building HVAC system to improve the indoor air quality. The system thus couples energy generation and carbon sequestering capabilities in the building sector.

The invention includes an apparatus for energy production and carbon sequestration. The apparatus includes a housing, a photovoltaic cell on a first side of the housing, and an electrochemical cell within the housing and adjacent the photovoltaic cell. A cathode side of the electrochemical cell reduces carbon dioxide to a hydrocarbon, preferably methane, and an anode side of the electrochemical cell oxidizes water to oxygen.

In embodiments of this invention, the electrochemical cell includes a catholyte chamber separated from an anolyte chamber. The catholyte chamber includes a carbon dioxide inlet at a first end and a hydrocarbon outlet at an opposing second end. The hydrocarbon outlet can be connected to a heating system/element of an air handling unit. The anolyte chamber includes a water inlet and an oxygen outlet, which can likewise be connected to an air inlet of the air handling unit (e.g., blower or fan).

The cathode side includes at least one transition metal catalyst, and a catholyte. The transition metal catalyst can be $M_yX_z$, wherein M is a transition metal, X is a carbide, nitride, carbonitride, phosphide or chalcogen, and y and z are stoichiometric ratio integers (e.g., each 1-4, respectively). The transition metal catalyst desirably has a nanoparticle, nanoflake, nanosheet, and/or nanoribbon form, such as having an average size between about 1 nm and 400 nm. An exemplary catalyst is a nanostructured transition metal MXene (e.g., carbide, nitride, or carbonitride). An exemplary anode side catalyst is a cobalt catalyst, along with an anolyte and any helper catalyst(s).

In embodiments of this invention, the apparatus is used as a building façade. The housing can be or include a building façade cladding. The invention further includes a building façade including the apparatus as an outer surface.

The invention further includes a method for energy production and carbon sequestration. The method of embodiments of this invention includes: providing a photovoltaic cell in combination with an electrochemical cell; contacting carbon dioxide with a reduction catalyst within the electrochemical cell; contacting water with an oxidation catalyst within the electrochemical cell; and applying a potential to the electrochemical cell from the photovoltaic cell to reduce the carbon dioxide to a hydrocarbon, preferably methane, and oxidize the water into oxygen. The method can further include integrating the photovoltaic cell in combination with the electrochemical cell in a building façade. The method is implemented, such as for a building façade, with any apparatus combination as described herein. An exemplary reduction catalyst is a transition metal catalyst as described above.

Other objects and advantages will be apparent to those skilled in the art from the following detailed description taken in conjunction with the appended claims and drawings.

DESCRIPTION OF THE INVENTION

This invention relates generally to reduction of carbon dioxide ($CO_2$) to hydrocarbons such as methane ($CH_4$) and, more particularly, to MXene materials as catalysts for this reduction.

The invention provides transition metal catalysts and method of using the catalysts to reduce carbon dioxide, such as to hydrocarbons for use as fuel. Exemplary catalysts include nanostructured MXenes, such as typically in one of the following structures: $M_2X$ (e.g., $M_2N$, $M_2C$, or $M_2CN$), $M_3X_2$ (e.g., $M_3N_2$, $M_3C_2$, or $M_3C_2N$), and $M_4X_3$ (e.g., $M_4C_3N$), wherein M is a transition metal and X is carbon, nitrogen, or a carbonitride. The invention further includes a nanostructured bimetallic or trimetallic MXene carbide, nitride, or carbonitride, such as $M^1xM^2yXz$ or $M^1wM^2xM^3yXz$, wherein $M^1$, $M^2$, and $M^3$ are each different metal types, desirably including one or more different types of transition metals, X is carbon, nitrogen or carbonitride, and w, x, y, and z are each stoichiometric ratio integers. One presently preferred transition metal is molybdenum, such as in the form of $Mo_2C$ or $Mo_2CN$ nanoparticles or nanoflakes. Other exemplary MXenes include, without limitation, carbides, nitrides, or carbonitrides of cobalt, titanium, tungsten, etc. Multiple metals and/or multiple stoichiometries are also possible for the MXene catalysts.

Two ultimate goals in the electrochemical reduction of carbon dioxide can be addressed by using the transition metal MXene catalysts of this invention. First, it tackles the amount of required energy to reduce the $CO_2$ into useful products. The observed onset overpotential for the $CH_4$ formation (−0.15 V vs. RHE) using $Mo_2C$ is the lowest reported to date which shows its superior catalytic activity among commonly used catalysts. Second, employing $Mo_2C$ catalysts provides production of $CH_4$ having two orders of magnitude higher numbers of product formation compared to typical state of the art metal catalysts (e.g., copper).

Figure 1:
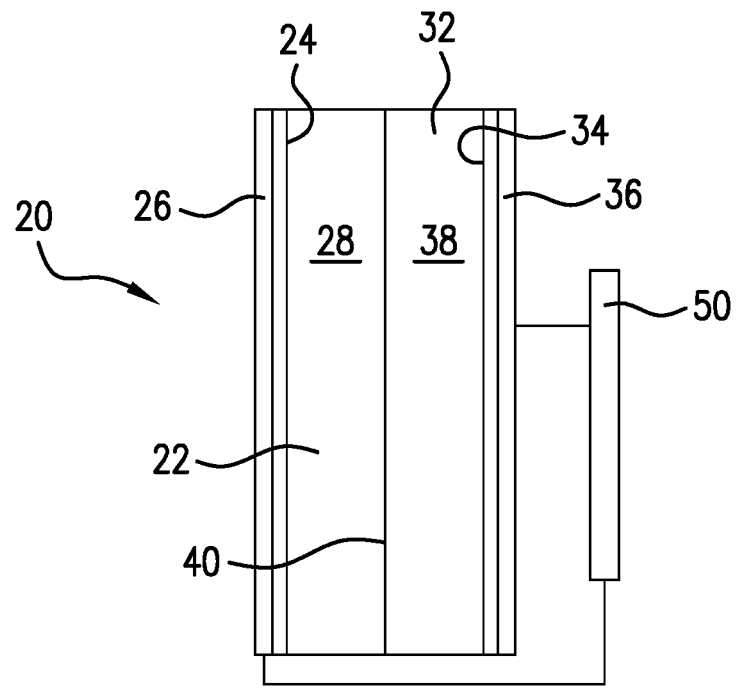
FIG. 1 is a schematic sectional view of an electrochemical device according to one embodiment of this invention.

FIG. 1 is a schematic sectional view of an electrochemical device 20 (e.g., electrochemical cell) with a first compartment 22 including at least one transition metal MXene 24 disposed on a cathode 26. Device 20 includes a second compartment 32 including at least one water oxidizing catalyst 34 disposed on an anode 36. Compartments 22 and 32 include a first electrolyte 28 and a second electrolyte 38, respectively, and are in ionic contact through an ion-conductive membrane 40. An electrical potential source 50 is included. In embodiments of this invention, the electrical potential source is a photovoltaic cell. The device 20 further includes a carbon dioxide inlet and a suitable hydrocarbon outlet, and a corresponding anode side inlet and outlet.

The transition metal MXene catalysts of embodiments of this invention have a general chemical formula of $M_yX_z$, wherein M is a transition metal, X is carbon and/or nitrogen, and y and z are stoichiometric ratio integers (generally each one of 1-4, with y and z being equal or y one whole number greater than z; e.g., $M_2X$, $M_3X_2$, and/or $M_4X_3$). In embodiments of this invention, the catalyst is or includes $M_{n+1}X_n$, wherein M is a transition metal, X is carbon and/or nitrogen, and n is zero or an integer. In additional embodiments of this invention, the catalyst is or includes $M_xC_yN_z$ wherein M is a transition metal, C is carbon, N is nitrogen, and x, y and z are each an stoichiometric ratio integer (e.g., with each of y and z being independently one of 0 to 3, with at least one of y and z not zero, and x, y and/or z being equal or x being one whole number greater than y or z (e.g., MC, MN, $M_2C$, $M_2N$, $M_3C_2$, $M_4C_3$, $M_2CN$, $M_3C_2N$, and/or $M_4C_3N$). Presently preferred transition metals include molybdenum, tungsten, titanium, or cobalt. Exemplary catalyst materials include, without limitation, WC, TiC, $Co_2C$, and/or $Mo_2C$.

The transition metal MXene catalysts of embodiments of this invention further includes alloyed catalysts, having two or more different types of metals bonded within the alloy. The alloy catalysts of this invention are particularly suited for producing hydrocarbons other than methane. Embodiments of this invention provide and use multinary metallic atoms with various stoichiometry bonding with carbon and/or nitrogen such as MoxCuyZnzC. These materials, particularly with further modifications in the structure, promote C—C bonding and allow for production of C1-C5 hydrocarbons, and preferably C2, C3, C4, or C5 hydrocarbons.

The transition metal catalyst can include a nanostructured bimetallic or trimetallic MXene carbide, nitride, or carbonitride, such as $M^1xM^2yXz$ or $M^1wM^2xM^3yXz$, wherein $M^1$, $M^2$, and $M^3$ are each different metal types, desirably including one or more different types of transition metals, X is carbon, nitrogen or carbonitride, and w, x, y, and z are each stoichiometric ratio integers. Alloyed catalysts of this invention (e.g., $M^1$, $M^2$, and/or $M^3$) can include any combination of the following transition metals with carbide (C), nitride (N), or carbonitride (CN), with various stoichiometry: Ce, Sc, La, Ti, Zr, Hf, V, Nb, Ta, Cr, Mo, W, Mn, Re, Fe, Ru, Co, Ir, Ni, Pd, Pt, Cu, Ag, Au, Zn, Cd.

As a presently preferred example, the invention includes a bimetallic or trimetallic copper-based alloy. As an example, the invention includes a tungsten-copper alloy catalyst of the formula $W_{2-x}Cu_xC$ ($0.1 \leq X \leq 1$). The invention further includes trimetallic and high entropy alloy catalysis such as $W_{2-x-y}Cu_xM_yC$, where M is: Ce, Zn, Ta, Fe, Sc, Zr, Mn, Cd, La, Cr, or Sn, with $0.1 \leq X \leq 1$ and $0.1 < y < 0.5$. This combination can be used for nitride and carbonitride materials, for example, $W_{2-x}Cu_xN$ or $W_{2-x}Cu_xCN$, and $W_{2-x-y}Cu_xM_yN$ or $W_{2-x-y}Cu_xM_yCN$.

In embodiments of this invention, the nanostructured carbide, nitride, or carbonitride catalysts are further modified to promote catalytic activity and active sites, such as with surface defects or other modifications. Exemplary modifications include, without limitation, defective sites, doped structures or other surface functionalized structures, such as modified with alkali and earth alkali metals and halides, oxygen, phosphorus, sulfur, selenium, tellurium, and/or hydroxide Embodiments of the invention incorporate electrolytes that do not involve water or a buffer. Exemplary electrolytes include highly alkaline solutions of KOH, CsOH, or NaOH, preferably about 0.5-10 M. Acidic electrolytes without water or buffer may also be used in particular instances.

The transition metal MXene catalysts can be provided in a variety of forms, for example, as a bulk material, in nanostructure form, as a collection of particles, and/or as a collection of supported particles. The MXene catalyst in bulk form can have a layered structure as is typical for such compounds. The MXene catalyst may have a nanostructure morphology, including but not limited to monolayers, nanotubes, nanoparticles, nanoflakes (e.g., multilayer nanoflakes), nanosheets, nanoribbons, nanoporous solids, etc. As used herein, the term "nanostructure" refers to a material with a dimension (e.g., of a pore, a thickness, a diameter, as appropriate for the structure) in the nanometer range.

In some embodiments, the catalyst is a layer-stacked bulk MXene with metal atom-terminated edges. In other embodiments, MXene nanoparticles may be used in the devices and methods of the disclosure. In other embodiments, al MXene nanoflakes may be used in the devices and methods of the disclosure. Nanoflakes can be made, for example, via liquid exfoliation, as described in Coleman, J. N. et al., "Two-dimensional nanosheets produced by liquid exfoliation of layered materials." Science 331, 568-71 (2011) and Yasaei, P. et al., "High-Quality Black Phosphorus Atomic Layers by Liquid-Phase Exfoliation." Adv. Mater. (2015) (doi: 10.1002/adma.201405150), each of which is hereby incorporated herein by reference in its entirety. In other embodiments, transition metal MXene nanoribbons may be used in the devices and methods of the disclosure. In other embodiments, transition metal MXene nanosheets may be used in the devices and methods of the disclosure. The person of ordinary skill in the art can select the appropriate morphology for a particular device.

In some embodiments of the methods and devices as otherwise described herein, the transition metal MXene nanostructures (e.g., nanoflakes, nanoparticles, nanoribbons, etc.) have an average size between about 1 nm and 1000 nm. The relevant size for a nanoparticle is its largest diameter. The relevant size for a nanoflake is its largest width along its major surface. The relevant size for a nanoribbon is its width across the ribbon. The relevant size for a nanosheet is its thickness. In some embodiments, the transition metal MXene nanostructures have an average size between from about 1 nm to about 400 nm, or about 1 nm to about 350 nm, or about 1 nm to about 300 nm, or about 1 nm to about 250 nm, or about 1 nm to about 200 nm, or about 1 nm to about 150 nm, or about 1 nm to about 100 nm, or about 1 nm to about 80 nm, or about 1 nm to about 70 nm, or about 1 nm to about 50 nm, or 50 nm to about 400 nm, or about 50 nm to about 350 nm, or about 50 nm to about 300 nm, or about 50 nm to about 250 nm, or about 50 nm to about 200 nm, or about 50 nm to about 150 nm, or about 50 nm to about 100 nm, or about 10 nm to about 70 nm, or about 10 nm to about 80 nm, or about 10 nm to about 100 nm, or about 100 nm to about 500 nm, or about 100 nm to about 600 nm, or about 100 nm to about 700 nm, or about 100 nm to about 800 nm, or about 100 nm to about 900 nm, or about 100 nm to about 1000 nm, or about 400 nm to about 500 nm, or about 400 nm to about 600 nm, or about 400 nm to about 700 nm, or about 400 nm to about 800 nm, or about 400 nm to about 900 nm, or about 400 nm to about 1000 nm.

In certain embodiments of the methods and devices as otherwise described herein, transition metal MXene nanoflakes have an average thickness between about 1 nm and about 100 μm (e.g., about 1 nm to about 10 μm, or about 1 nm to about 1 μm, or about 1 nm to about 1000 nm, or about 1 nm to about 400 nm, or about 1 nm to about 350 nm, or about 1 nm to about 300 nm, or about 1 nm to about 250 nm, or about 1 nm to about 200 nm, or about 1 nm to about 150 nm, or about 1 nm to about 100 nm, or about 1 nm to about 80 nm, or about 1 nm to about 70 nm, or about 1 nm to about 50 nm, or about 50 nm to about 400 nm, or about 50 nm to about 350 nm, or about 50 nm to about 300 nm, or about 50 nm to about 250 nm, or about 50 nm to about 200 nm, or about 50 nm to about 150 nm, or about 50 nm to about 100 nm, or about 10 nm to about 70 nm, or about 10 nm to about 80 nm, or about 10 nm to about 100 nm, or about 100 nm to about 500 nm, or about 100 nm to about 600 nm, or about 100 nm to about 700 nm, or about 100 nm to about 800 nm, or about 100 nm to about 900 nm, or about 100 nm to about 1000 nm, or about 400 nm to about 500 nm, or about 400 nm to about 600 nm, or about 400 nm to about 700 nm, or about 400 nm to about 800 nm, or about 400 nm to about 900 nm, or about 400 nm to about 1000 nm); and average dimensions along the major surface of about 20 nm to about 100 μm (e.g., about 20 nm to about 50 μm, or about 20 nm to about 10 μm, or about 20 nm to about 1 μm, or about 50 nm to about 100 μm, or about 50 nm to about 50 μm, or about 50 nm to about 10 μm, or about 50 nm to about 1 μm, or about 100 nm to about 100 μm, or about 100 nm to about 50 μm, or about 100 nm to about 10 μm, or about 100 nm to about 1 μm), The aspect ratio (largest major dimension:thickness) of the nanoflakes can be on average, for example, at least about 5:1, at least about 10:1 or at least about 20:1. For example, in certain embodiments the transition metal MXene nanoflakes have an average thickness in the range of about 1 nm to about 1000 nm (e.g., about 1 nm to about 100 nm), average dimensions along the major surface of about 50 nm to about 10 μm, and an aspect ratio of at least about 5:1.

The invention includes methods of electrochemically reducing carbon dioxide by introducing the carbon dioxide to a transition metal MXene catalyst in an electrochemical cell. Embodiments of this invention utilize nanostructured transition metal MXenes as catalysts in the electrocatalytic conversion of carbon dioxide ($CO_2$) to produce hydrocarbon, such methane ($CH_4$), the main component of natural gas, at remarkably low overpotentials.

Figure 2:
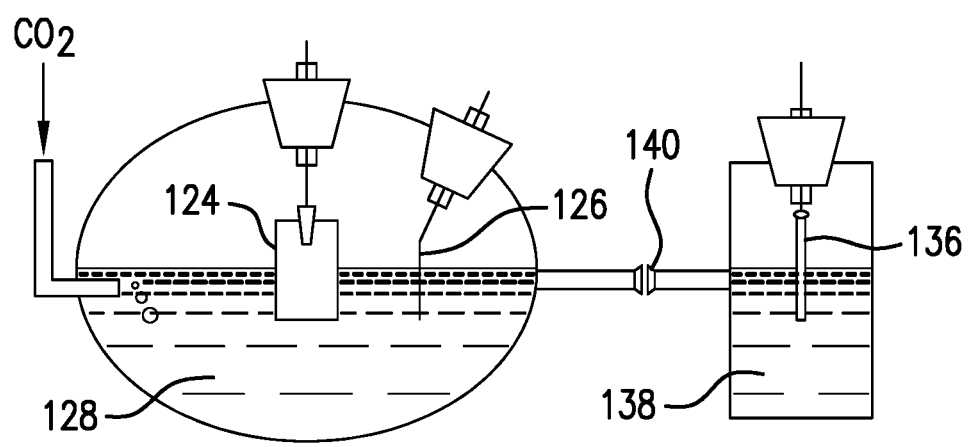
FIG. 2 representatively illustrates a two-compartment three-electrode electrochemical cell according to one embodiment of this invention.

The nanostructured transition metal MXenes can be synthesized using liquid exfoliation techniques, and were tested in a two-compartment three-electrode electrochemical cell as a working electrode, as shown in FIG. 2. FIG. 2 representatively illustrates the two-compartment three-electrode electrochemical cell according to embodiments of this invention used for testing. Transition metal carbides were drop-cast onto a glassy carbon substrate to form the working electrode 124. Platinum gauze or other suitable material can be used as the counter and reference electrodes 136 and 126, respectively. The working electrode 124, reference electrode 126, and counter electrode 136 are immersed in an aqueous electrolyte solution 128 and 138, respectively. The cathode and anode are separated by an ion-conductive membrane 140 to eliminate potential product oxidation at the anode 136 surface.

Testing results indicated that $Mo_2C$ exhibited an onset potential of −0.15 V vs. RHE, which is a potential where the reduction reaction begins in a buffer electrolyte of 1 M $KHCO_3$. The recorded onset potential for $Mo_2C$ is the lowest overpotential (−0.15 V), excess energy beyond thermodynamic potential, for $CH_4$ formation reported so far, which is 650 mV less than that of copper (−0.8 V). $Mo_2C$ also exhibits significantly higher faradaic efficiency at a potential range of −0.15 to −0.8 V. For instance, at a potential of −0.4 V, methane formation F.E. for $Mo_2C$ nanoflake is 44% while copper has a negligible faradaic efficiency of less than 1%. Moreover, the calculated turnover frequency (TOF), the number of product ($CH_4$) formation per active sites, for $Mo_2C$ indicated approximately two orders of magnitude higher $CH_4$ formation than that of copper at a potential range of −0.15 to −0.8 V vs. RHE.

Thus, the invention provides a method and system to recycle $CO_2$ into hydrocarbons, such as $CH_4$ (natural gas) in an energy efficient and economically feasible electrochemical process. A scale-up of the invention coupled with solar energy cells can develop a carbon-zero electrochemical system in which $CO_2$ from the air, wastes of the big industries, etc. can be reduced to a profitable product (natural gas) that can directly be used as a fuel.

This invention includes a method and system for carbon sequestration and/or energy production, implemented for or as outer surfaces of structures, such as residential and/or commercial building structures. Embodiments of this invention provide a cladding, or building skin, that acts as an artificial leaf to achieve at least two objectives simultaneously: a) produces energy for operation of buildings, and b) sequesters carbon through chemical processes. The invention includes a façade cladding system that not only contributes to traditional aesthetical, thermal, and structural roles of building skins, but also is able to approach PV panels in terms of efficiency in energy generation, and at the same time absorb carbon dioxide (which is a major cause of global warming).

Embodiments of this invention provide and/or incorporate an artificial leaf system which combines sunlight, carbon dioxide, and water to generate energy in an artificial photosynthesis process, adjusted with new materials and chemical processes to improve efficiency with regard to energy production and carbon sequestration. This system is integrated into a building cladding or skin (such as opaque external walls) to convert façade cladding systems into energy-generator/carbon-removal systems.

This invention also includes methods of electrochemically reducing carbon dioxide by introducing the carbon dioxide to one or more reduction catalysts in an electrochemical cell. Embodiments of this invention utilize nanostructured catalysts, such as transition metal catalysts, in the electrocatalytic conversion of carbon dioxide ($CO_2$) to produce hydrocarbons such as methane ($CH_4$), the main component of natural gas, at low overpotentials.

Figure 3:
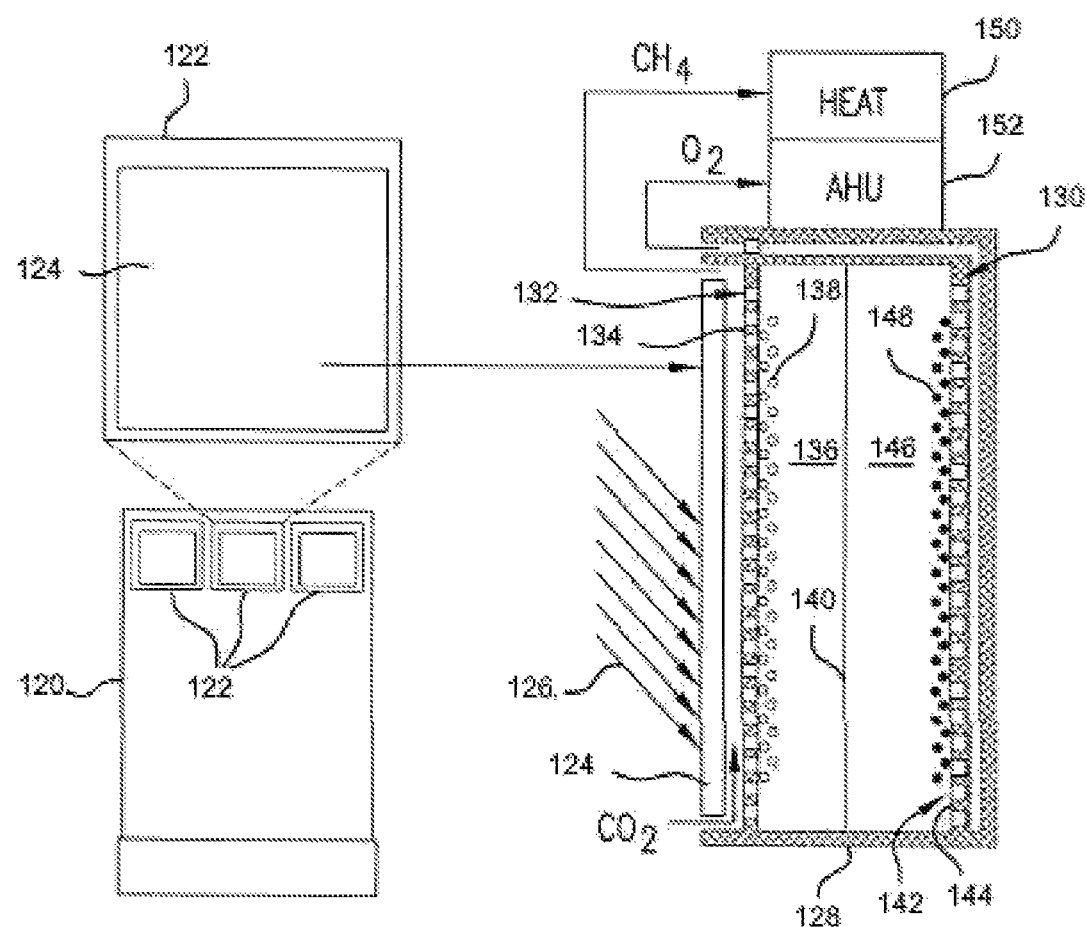
FIG. 3 is a general schematic, with a partial sectional view of an electrochemical device, according to a system of one embodiment of this invention.

FIG. 3 generally illustrates an artificial leaf-based façade cladding system according to embodiments of this invention. FIG. 3 shows a representative building structure 120 including outer surface claddings 122. The claddings can be sized and shaped as needed for any particular building structure. The claddings can also be incorporated in various and alternative placements on the building, such as near or along a top edge of an outer wall, on a rooftop or structure thereon, or integrated in, between and/or around windows, design elements, etc.

FIG. 3 shows a sectional view of one of the claddings 122. The cladding 122 includes an energy source, preferably a photovoltaic cell 124 on a side, e.g., an outer side facing the sun light 126, of a system support housing 128. Any suitable photovoltaic cell can be used, depending on need, such as a triple junction photovoltaic (3j-PV) cell. The photovoltaic cell can provide solar energy to the grid, the building, and/or the cladding itself.

The support housing further includes, contains, or otherwise supports an electrochemical cell 130 for reducing carbon dioxide, desirably using energy potential from the photovoltaic cell 124. The electrochemical cell 130 includes a cathode side 132 with a cathode 134 partitioned from an anode side 142 with anode 144. The cathode side 132 includes a suitable catholyte 136 in ionic contact with a suitable anolyte 146 of the anode side 142 by a suitable ion-conductive membrane 140. The catholyte and anolyte can be a solution, such as separated by a suitable ion-conductive membrane 140, or a solid or semi-solid polymer based electrolyte.

The cathode side 132 includes a catalyst 138 that, together with liquid catholyte 136 (e.g., imidazolium) as a co-catalyst system, reduces carbon dioxide ($CO_2$) to a hydrocarbon, such as methane ($CH_4$). The catalyst 138 can further be a functionalized co-catalyst, such as a co-catalyst including an imidazolium-functionalized transition metal carbide, nitride, or carbonitride of the types discussed below. The anode side 142 can include a second catalyst 148, for example, a cobalt catalyst, which co-currently oxidizes water in the anolyte solution 146 into oxygen without applying any external potential. The catalysts, discussed further below, can be any suitable catalyst, and are desirably coated or otherwise contained on, in, or at, the cathode 134 or anode 144, respectively.

Carbon dioxide is introduced through a carbon inlet to the cathode side 132 and is reduced to methane collected and released through a carbon outlet. Similarly, water introduced to the anode side 142 results in oxygen gas released through an oxygen outlet. The collected hydrocarbon and/or oxygen can be collected or delivered as desired. For example, the anode and/or cathode can include suitable perforations or pores to provide paths for the gas transfer to and from the catalysts. Additionally or alternatively, any suitable piping and valves can be used to provide and/or control the carbon dioxide, water, oxygen, and/or hydrocarbon.

In FIG. 3, the methane is delivered through a conduit into a heating system 150 of the building 120. The oxygen is released to the environment, and preferably the building interior through the building air handler unit (AHU) 152 of the heating, ventilation, and air conditioning system to purify air by providing the fresh $O_2$ into the building.

The transition metal MXene catalysts of embodiments of this invention have a general chemical formula of $M_yX_z$, wherein M is a transition metal, X is carbon and/or nitrogen (i.e., MXene), phosphor, or a chalcogen, and y and z are stoichiometric ratio integers (generally each one of 1-4, with y and z being equal or y one whole number greater than z; e.g., $M_2X$, $M_3X_2$, and/or $M_4X_3$). In embodiments of this invention, the catalyst is or includes $M_{n+1}$-$X_n$, wherein M is a transition metal, X is carbon and/or nitrogen, and n is zero or an integer. In additional embodiments of this invention, the catalyst is or includes $M_xC_yN_z$ wherein M is a transition metal, C is carbon, N is nitrogen, and x, y and z are each a stoichiometric ratio integer (e.g., with each of y and z being independently one of 0 to 3, with at least one of y and z not zero, and x, y and/or z being equal or x being one whole number greater than y or z (e.g., MC, MN, $M_2C$, $M_2N$, $M_3C_2$, $M_4C_3$, $M_2CN$, $M_3C_2N$, and/or $M_4C_3N$). In other embodiments of this invention, the catalyst is or includes $M_{n-1}X_n$, wherein M is a transition metal, X is carbon and/or nitrogen, and n is zero or an integer. Presently preferred transition metals include molybdenum, tungsten, titanium, or cobalt. Exemplary catalyst materials, without limitation, $MoS_2$, $MoSe_2$, $Mo_2C$, $Co_2C$, TiC, $TiS_2$, $TiSe_2$, WC, $WS_2$, and/or $WSe_2$.

The at least one transition metal catalyst can be provided in a variety of forms, for example, as a bulk material, in nanostructure form, as a collection of particles, and/or as a collection of supported particles. As the person of ordinary skill in the art will appreciate, the transition metal catalyst in bulk form may have a layered structure as is typical for such compounds. The transition metal catalyst may have a nanostructure morphology, including but not limited to monolayers, nanotubes, nanoparticles, nanoflakes (e.g., multilayer nanoflakes), nanosheets, nanoribbons, nanoporous solids, etc. As used herein, the term "nanostructure" refers to a material with a dimension (e.g., of a pore, a thickness, a diameter, as appropriate for the structure) in the nanometer range (i.e., greater than 1 nm and less than 1 micron).

In some embodiments, the transition metal catalyst is a layer-stacked bulk transition metal catalyst with metal atom-terminated edges. In other embodiments, transition metal catalyst nanoparticles may be used in the devices and methods of the disclosure. In other embodiments, transition metal catalyst nanoflakes may be used in the devices and methods of the disclosure. Nanoflakes can be made, for example, via liquid exfoliation, as described in Coleman, J. N. et al., "Two-dimensional nanosheets produced by liquid exfoliation of layered materials." Science 331, 568-71 (2011) and Yasaei, P. et al., "High-Quality Black Phosphorus Atomic Layers by Liquid-Phase Exfoliation." Adv. Mater. (2015) (doi:10.1002/adma.201405150), each of which is hereby incorporated herein by reference in its entirety. In other embodiments, transition metal catalyst nanoribbons may be used in the devices and methods of the disclosure. In other embodiments, transition metal catalyst nanosheets may be used in the devices and methods of the disclosure. The person of ordinary skill in the art can select the appropriate morphology for a particular device.

In some embodiments of the methods and devices as otherwise described herein, the transition metal catalyst nanostructures (e.g., nanoflakes, nanoparticles, nanoribbons, etc.) have an average size between about 1 nm and 1000 nm. The relevant size for a nanoparticle is its largest diameter. The relevant size for a nanoflake is its largest width along its major surface. The relevant size for a nanoribbon is its width across the ribbon. The relevant size for a nanosheet is its thickness. In some embodiments, the transition metal catalyst nanostructures have an average size between from about 1 nm to about 400 nm, or about 1 nm to about 350 nm, or about 1 nm to about 300 nm, or about 1 nm to about 250 nm, or about 1 nm to about 200 nm, or about 1 nm to about 150 nm, or about 1 nm to about 100 nm, or about 1 nm to about 80 nm, or about 1 nm to about 70 nm, or about 1 nm to about 50 nm, or 50 nm to about 400 nm, or about 50 nm to about 350 nm, or about 50 nm to about 300 nm, or about 50 nm to about 250 nm, or about 50 nm to about 200 nm, or about 50 nm to about 150 nm, or about 50 nm to about 100 nm, or about 10 nm to about 70 nm, or about 10 nm to about 80 nm, or about 10 nm to about 100 nm, or about 100 nm to about 500 nm, or about 100 nm to about 600 nm, or about 100 nm to about 700 nm, or about 100 nm to about 800 nm, or about 100 nm to about 900 nm, or about 100 nm to about 1000 nm, or about 400 nm to about 500 nm, or about 400 nm to about 600 nm, or about 400 nm to about 700 nm, or about 400 nm to about 800 nm, or about 400 nm to about 900 nm, or about 400 nm to about 1000 nm.

In certain embodiments of the methods and devices as otherwise described herein, transition metal catalyst nanoflakes have an average thickness between about 1 nm and about 100 µm (e.g., about 1 nm to about 10 µm, or about 1 nm to about 1 µm, or about 1 nm to about 1000 µm, or about 1 nm to about 400 nm, or about 1 nm to about 350 nm, or about 1 nm to about 300 nm, or about 1 nm to about 250 nm, or about 1 nm to about 200 nm, or about 1 nm to about 150 nm, or about 1 nm to about 100 nm, or about 1 nm to about 80 nm, or about 1 nm to about 70 nm, or about 1 nm to about 50 nm, or about 50 nm to about 400 nm, or about 50 nm to about 350 nm, or about 50 nm to about 300 nm, or about 50 nm to about 250 nm, or about 50 nm to about 200 nm, or about 50 nm to about 150 nm, or about 50 nm to about 100 nm, or about 10 nm to about 70 nm, or about 10 nm to about 80 nm, or about 10 nm to about 100 nm, or about 100 nm to about 500 nm, or about 100 nm to about 600 nm, or about 100 nm to about 700 nm, or about 100 nm to about 800 nm, or about 100 nm to about 900 nm, or about 100 nm to about 1000 nm, or about 400 nm to about 500 nm, or about 400 nm to about 600 nm, or about 400 nm to about 700 nm, or about 400 nm to about 800 nm, or about 400 nm to about 900 nm, or about 400 nm to about 1000 nm); and average dimensions along the major surface of about 20 nm to about 100 µm (e.g., about 20 nm to about 50 µm, or about 20 nm to about 10 µm, or about 20 nm to about 1 µm, or about 50 nm to about 100 µm, or about 50 nm to about 50 µm, or about 50 nm to about 10 µm, or about 50 nm to about 1 µm, or about 100 nm to about 100 µm, or about 100 nm to about 50 µm, or about 100 nm to about 10 µm, or about 100 nm to about 1 µm), The aspect ratio (largest major dimension:thickness) of the nanoflakes can be on average, for example, at least about 5:1, at least about 10:1 or at least about 20:1. For example, in certain embodiments the transition metal catalyst nanoflakes have an average thickness in the range of about 1 nm to about 1000 nm (e.g., about 1 nm to about 100 nm), average dimensions along the major surface of about 50 nm to about 10 µm, and an aspect ratio of at least about 5:1.

Thus, the invention provides a façade cladding system and method that provides an artificial photosynthesis process. This system has the potential to fundamentally change the way buildings are designed and constructed. With this invention, building envelope for architects and building scientists would no longer be seen as a building element through which heat is lost or gained but also a building element that actively contributes to meeting the energy needs of the building while reducing the $CO_2$ emissions of their surrounding environment.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of electrochemically reducing carbon dioxide, comprising:
   introducing the carbon dioxide to a catalyst comprising a nanostructured bimetallic or trimetallic MXene carbide, nitride, or carbonitride catalyst coated on a cathode and in contact with a liquid catholyte in an electrochemical cell, wherein the nanostructured bimetallic or trimetallic MXene carbide, nitride, or carbonitride catalyst comprises a plurality of nanoparticles, nanoflakes, and/or nanoribbons, having an average structure size between about 1 nm and 400 nm;
   applying a potential to the electrochemical cell; and
   converting the carbon dioxide to a hydrocarbon.

2. A method of claim 1, further comprising a co-catalyst system comprising an imidazolium-functionalized nanostructured bimetallic or trimetallic MXene carbide, nitride, or carbonitride.

3. A method of claim 1, further comprising:
   providing carbon dioxide to the electrochemical cell; and
   applying the potential to the electrochemical cell in the presence of the carbon dioxide to reduce the carbon dioxide to the hydrocarbon.

4. The method of claim 3, further comprising an electrolyte of a solution of 1M $KHCO_3$ or 1M KOH, and saturating the electrolyte with the carbon dioxide.

5. A method of claim 1, wherein the nanostructured bimetallic or trimetallic MXene comprises molybdenum, tungsten, titanium, or cobalt.

6. A method of claim 1, wherein the catalyst comprises a nanoparticle form.

7. A method of claim 1, wherein the catalyst comprises a formula of $M^1xM^2yXz$ or $M^1wM^2xM^3yXz$, wherein each of $M^1$, $M^2$, and $M^3$ is a different metal type, X is carbon, nitrogen or carbonitride, and each of w, x, y, and z is a stoichiometric ratio integer.

8. A method of claim 7, further comprising an electrolyte without water or a buffer.

9. A method of claim 7, wherein the catalyst comprises a functionalized surface modification.

10. A method of claim 1, wherein the hydrocarbon is a C2, C3, C4, or C5 hydrocarbon.

11. A method of claim 1, wherein the catalyst comprises a bimetallic or trimetallic copper-based alloy.

12. A method of claim 11, wherein the catalyst comprises a tungsten-copper carbide, nitride, or carbonitride.

13. A method of claim 11, wherein the catalyst comprises a formula of $W_{2-x}Cu_xC$, $W_{2-x}Cu_xN$, $W_{2-x-y}Cu_xM_yC$, $W_{2-x-y}Cu_xM_yN$ or $W_{2-x-y}Cu_xM_yCN$, where M is Ce, Zn, Ta, Fe, Sc, Zr, Mn, Cd, La, Cr, or Sn, with $0.1 \leq X \leq 1$ and $0.1 < y < 0.5$.

14. A method of claim 1, wherein the catalyst comprises a functionalized surface modification.

15. The method of claim 14, wherein the catalyst comprises a surface modified with defects and/or modified with alkali and earth alkali metals and halides, oxygen, phosphorus, sulfur, selenium, tellurium, and/or hydroxide.

16. A method of claim 1, further comprising an electrolyte without water or a buffer.

* * * * *